United States Patent
Kawamura et al.

(10) Patent No.: US 8,648,554 B2
(45) Date of Patent: Feb. 11, 2014

(54) ELECTRIC MOTOR CAR CONTROL SYSTEM

(75) Inventors: Koki Kawamura, Suginami-ku (JP); Satoshi Nakamura, Fuchu (JP); Hiromitsu Ueda, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 294 days.

(21) Appl. No.: 13/276,355

(22) Filed: Oct. 19, 2011

(65) Prior Publication Data

US 2012/0032533 A1 Feb. 9, 2012

Related U.S. Application Data

(63) Continuation of application No. PCT/JP2009/071765, filed on Dec. 28, 2009.

(30) Foreign Application Priority Data

Apr. 23, 2009 (JP) ................................. 2009-105523

(51) Int. Cl.
*H02P 1/00* (2006.01)

(52) U.S. Cl.
USPC ...... 318/130; 318/400.31; 318/505; 318/507; 318/801; 318/154; 324/509; 324/510

(58) Field of Classification Search
USPC .............. 318/34, 130, 400.31, 505, 506, 507, 318/532, 514, 670, 400.35, 969, 154, 151, 318/471; 363/81, 131, 132; 399/69, 88, 33, 399/81, 18; 219/216, 482, 497, 511; 324/509, 510; 361/42, 50
See application file for complete search history.

(56) References Cited

U.S. PATENT DOCUMENTS 4,449,079 A * 5/1984 Erdman .................. 318/400.31
6,856,137 B2 * 2/2005 Roden et al. .................. 324/509

FOREIGN PATENT DOCUMENTS

| JP | 10-313501 | | 11/1998 |
|---|---|---|---|
| JP | 2004-166380 | | 6/2004 |
| JP | 2004166380 A | * | 6/2004 |
| JP | 2008-295126 | | 12/2008 |
| JP | 2008295126 A | * | 12/2008 |
| JP | 2009-72049 | | 4/2009 |
| JP | 2009072049 A | * | 4/2009 |

OTHER PUBLICATIONS

International Search Report mailed on Mar. 23, 2010, with English translation, issued for International Application No. PCT/JP2009/071765, filed on Dec. 28, 2009.
International Written Opinion mailed Mar. 23, 2010, issued for International Application No. PCT/JP2009/071765, filed on Dec. 28, 2009.

* cited by examiner

*Primary Examiner* — Eduardo Colon Santana
*Assistant Examiner* — Jorge Carrasquillo
(74) *Attorney, Agent, or Firm* — Oblon, Spivak, McClelland, Maier & Neustadt, L.L.P.

(57) ABSTRACT

An embodiment of an electric motor car control system includes a resistor connected parallel to a main motor cut-off switch, or a switch for grounding terminals of the main motor, to discharge electric charges accumulated in stray capacitances of the main motor, whereby the electric motor car control system can prevent electrical shocks due to electric charges accumulated in main motor stray capacitances.

9 Claims, 3 Drawing Sheets

ELECTRIC MOTOR CAR CONTROL SYSTEM

CROSS-REFERENCE

This application is a Continuation of PCT Application No. PCT/JP2009/071765, filed on 2009 Dec. 28, and claims the priority of Japanese Patent Application No. 2009-105523, filed on 2009 Apr. 23, the content of both of which is incorporated herein by reference.

FIELD

Embodiments described herein relate generally to an electric motor car control system provided with main motor cut-off switches.

BACKGROUND

In the past, an electric motor car control system provided with main motor cut-off switches have a technical issue that the system cannot prevent electrical shocks due to electric charges accumulated in stray capacitances of a main motor, even in an open state of the set of main motor cut-off switches.

DESCRIPTION OF EMBODIMENTS

There will be described embodiments with reference to the drawings. It is noted that, in the description, identical constituent components are designated at identical reference signs, omitting redundant description.

Embodiments herein have been devised in view of such technical problems in the past. It is an object thereof to provide an electric motor car control system with a set of main motor cut-off switches, as the electric motor car control system is adapted to prevent electrical shocks due to electric charges accumulated in stray capacitances of a main motor, even in an open state of the set of main motor cut-off switches. For the adaptation, an implement employed surely works to discharge electric charges accumulated in stray capacitances of the main motor.

According to an aspect of embodiment, there is provided an electric motor car control system including a filter capacitor, an inverter, an alternate current main motor, a set of main motor cut-off switches, a discharge resistor, and a resistor set. The filter capacitor is connected to a direct current power source, through a main switch. The inverter is connected parallel to the filter capacitor, to convert a direct current into an alternate current. The alternate current main motor is connected to an alternate current end of the inverter. The set of main motor cut-off switches is inserted in wirings for phases of alternate current between the alternate current end of the inverter and the main motor. The discharge resistor is connected to the filter capacitor. The discharge switch is interlocked with the main switch, to be open when the main switch is close, and close when the main switch is open, to ground the discharge resistor to a ground. The resistor set is connected to the wirings, parallel to a main motor cut-off switch subset for one or more phases of the set of main motor cut-off switches for the phases of alternate current.

According to certain embodiments, there is an electric motor car control system provided with a set of main motor cut-off switches and adapted to discharge electric charges accumulated in stray capacitances of a main motor, allowing for prevention of electrical shocks due to electric charges accumulated in main motor stray capacitances, like electric motor car control systems provided without main motor cut-off switches.

First Embodiment

Figure 1:
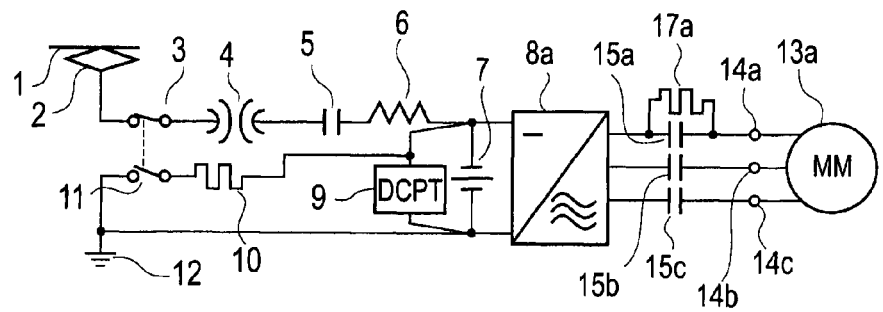
FIG. 1 is a circuit diagram showing the configuration of a main circuit of an electric motor car control system including a resistor connected parallel to a set of main motor cut-off switches according to a first embodiment.
Figure 2:
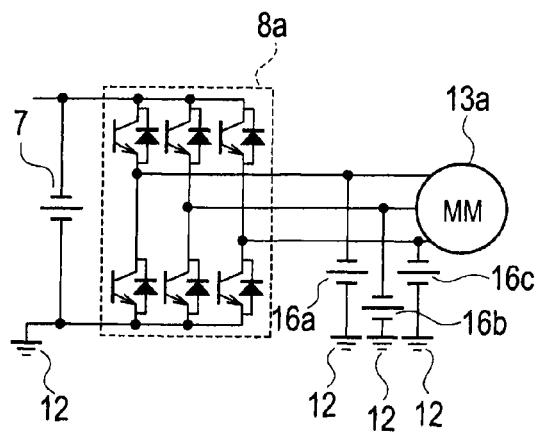
FIG. 2 is a schematic diagram showing a relation between a main circuit and stray capacitances of a main motor in the first embodiment.

Description is now made of an electric motor car control system according to a first embodiment, with reference to FIGS. 1 and 2. FIG. 1 shows the electric motor car control system according to the first embodiment.

In FIG. 1, designated at 1 is an overhead line, 2 is a pantograph, 3 is a main switch, 4 is a high-speed circuit breaker, 5 is a line breaker, 6 is a filter reactor, 7 is a filter capacitor, and 8a is a VVVF inverter. 9 is a voltage detector for the filter capacitor 8a, and 10 is a discharge resistor for the filter capacitor 8a and the like. 11 is a discharge switch, and 12 is a ground. The main switch 3 and the discharge switch 11 are interlocked with each other, for either to be open when the other is close.

Further, in FIG. 1, designated at 13a is a main motor, 14a is a main motor U-phase terminal, 14b is a main motor V-phase terminal, and 14c is a main motor W-phase terminal. Designated at 15a is a main motor U-phase cut-off switch, 15b is a main motor V-phase cut-off switch, and 15c is a main motor W-phase cut-off switch.

In addition, in FIG. 2, designated at 16a is a main motor U-phase stray capacitor, 16b is a main motor V-phase stray capacitor, and 16c is a main motor W-phase stray capacitor.

The VVVF inverter 8a serves to convert direct-current power taken in from the overhead line 1 into three-phase alternate-current power, to supply to the main motor 13a, as necessary. Along therewith, the filter capacitor 7 has a voltage raised to substantially the same level as the overhead line 1. To this point, there is a risk of electrical shocks to maintenance personnel touching a wiring of the main circuit, such as when keeping up the electric motor car. To avoid the risk, when the main switch 3 is opened, the discharge switch 11 interlocked therewith is closed to ground to a ground 12. This causes electric charges accumulated in the filter capacitor 7 to be consumed at the discharge resistor 10, whereby the filter capacitor 7 has a voltage lowered to a secure level.

As shown in FIG. 2, the main motor 13a has the stray capacitances 16a, 16b, and 16c parasitically produced between the ground 12 and the U-phase, V-phase, and W-phase terminals 14a, 14b, and 14c of the main motor 13a. Therefore, when the filter capacitor 7 is charged with electric energy taken in from the overhead line 1 to drive the main motor 13a, also the stray capacitances 16a, 16b, and 16c are charged. The stray capacitances 16a, 16b, and 16c thus have a voltage raised to approximately a half voltage of the filter capacitor 7.

In the case of configuration without main motor cut-off switches 15a, 15b and 15c, closing the discharge switch 11 permits electric charges accumulated in the filter capacitor 7 and the stray capacitances 16a, 16b, and 16c to be consumed at the discharge resistor 10. Therefore, after the discharge switch 11 is closed, the main motor terminals 14a, 14b, and 14c have a zero voltage. After the discharge, the main motor can be free from the fear of electrical shocks, even when touched.

However, in the case of configuration in FIG. 1, there is a set of main motor cut-off switches 15a, 15b, and 15c connected between the VVVF inverter 8a and the main motor 13a. In this configuration, the set of main motor cut-off switches 15a, 15b, and 15c may have an open state. With this state attendant, it is disabled to cause electric charges accumulated in the stray capacitances 16a, 16b, and 16c to be consumed at the discharge resistor 10, even when the discharge switch 11 is closed. In this situation, maintenance personnel may have anxieties about feeling electrical shocks, when touching any phase terminal 14a, 14b, or 14c of the main motor, as an issue.

In order to avoid such issue, this embodiment has a resistor 17a connected parallel to a U-phase electric motor cut-off switch 15a.

In the electric motor car control system according to this embodiment, when a main switch 3 is opened, a discharge switch 11 interlocked therewith is closed. This causes electric charges accumulated in a filter capacitor 7 to be consumed at a discharge resistor 10, whereby the filter capacitor 7 has a voltage lowered to a secure level. Then, a set of cut-off switches 15a, 15b, and 15c is opened to separate a main motor 13a from an inverter 8a.

In this embodiment, even with such an open state of the set of cut-off switches 15, those stray capacitances 16a, 16b, and 16c illustrated in FIG. 2 are connected to the discharge resistor 10, through the main motor 13a and the resistor 17a. Therefore, closing the discharge switch 11 causes electric charges accumulated in the stray capacitances 16a, 16b, and 16c to be discharged, together with electric charges in the filter capacitor 7, through the discharge resistor 10. This allows the stray capacitances 16a, 16b, and 16c to have a voltage lowered to a secure level.

It is noted that this embodiment has the resistor 17a connected parallel simply to the U phase that is one of three phases of the main motor. Instead, there may be a set of resistors connected to two or all of the three phases, as necessary, to attain similar effects.

Second Embodiment

Figure 3:
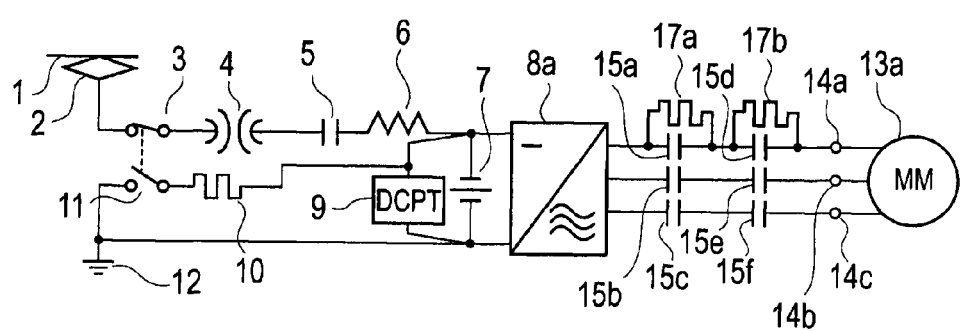
FIG. 3 is a circuit diagram showing the configuration of a main circuit of an electric motor car control system including a set of resistors connected respectively parallel to two sets of main motor cut-off switches connected in series according to a second embodiment.

Description is now made of an electric motor car control system according to a second embodiment, with reference to FIG. 3. FIG. 3 shows the electric motor car control system according to the second embodiment. This is different from the electric motor car control system according to the first embodiment shown in FIG. 1 in that it has two sets of main motor cut-off switches connected in series 15a, 15d; 15b, 15e; and 15c, 15f for U, V, and W phases at an alternate-current end of an inverter 8a. Further, there is a set of resistors 17a and 17b connected respectively parallel to main motor cut-off switches 15a and 15d constituting subsets of the sets above for the U phase that is one phase. The remaining constituent elements are common to those of the first embodiment.

According to this embodiment, equivalent effects to the first embodiment can be attained even in the configuration including two main motor cut-off switches connected in series every phase. It is noted that this embodiment also has the set of resistors 17a and 17b connected parallel simply to the U phase that is one of three phases of the main motor. Instead, there may be sets of resistors connected to two or all of the three phases, as necessary, to attain similar effects.

Third Embodiment

Figure 4:
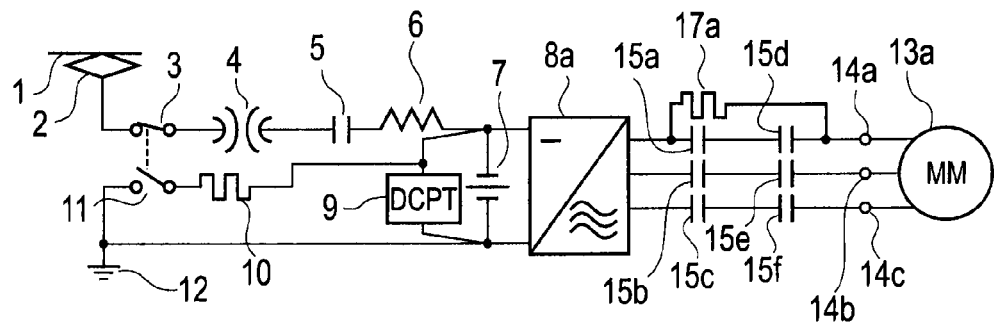
FIG. 4 is a circuit diagram showing the configuration of a main circuit of an electric motor car control system including a single resistor connected parallel to two sets of main motor cut-off switches connected in series according to a third embodiment.

Description is now made of an electric motor car control system according to a third embodiment, with reference to FIG. 4. FIG. 4 shows the electric motor car control system according to the third embodiment. This is different from the electric motor car control system according to the first embodiment shown in FIG. 1 in that it has two sets of main motor cut-off switches connected in series 15a, 15d; 15b, 15e; and 15c, 15f for U, V, and W phases at an alternate-current end of an inverter 8a. Further, there is a single resistor 17a connected parallel to both of main motor cut-off switches 15a and 15d constituting subsets of the sets above for the U phase that is one phase. The remaining constituent elements are common to those of the second embodiment.

According to this embodiment, a single resistor 17a is connected parallel to subsets of two sets of main motor cut-off switches. This arrangement allows similar effects to the first embodiment to be attained even with two main motor cut-off switches 15a and 15d connected in series.

Fourth Embodiment

Description is now made of an electric motor car control system according to a fourth embodiment, with reference to FIG. 2 and FIG. 4. FIG. 4 shows the electric motor car control system according to the fourth embodiment. This electric motor car control system of the fourth embodiment has a grounding switch 18 connected between a ground 12 and a main motor terminal 14c for a W phase that is one phase. It is noted that the connection to terminal may be made at any phase, as the selection is not specifically limited.

In the electric motor car control system according to this embodiment, when a main switch 3 is opened, a discharge switch 11 interlocked therewith is closed. This causes electric charges accumulated in a filter capacitor 7 to be consumed at a discharge resistor 10, whereby the filter capacitor 7 has a voltage lowered to a secure level. Then, a set of cut-off switches 15a, 15b, and 15c is opened to separate a main motor 13a from an inverter 8a, and the grounding switch 18 is closed to ground the main motor terminal 14c to the ground 12.

In this embodiment, even with such an open state of the set of cut-off switches 15, the grounding switch 18 works to discharge electric charges accumulated in those stray capacitances 16a, 16b, and 16c illustrated in FIG. 2, to the ground 12. This allows the stray capacitances 16a, 16b, and 16c to have a voltage lowered to a secure level.

Figure 5:
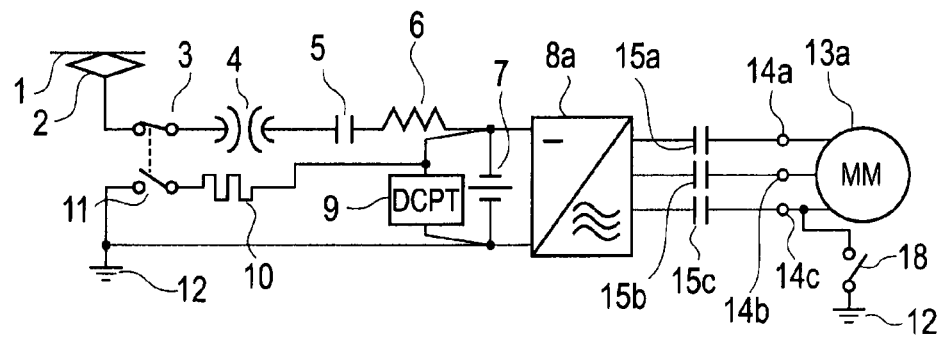
FIG. 5 is a circuit diagram showing the configuration of a main circuit of an electric motor car control system including a grounding switch connected to a main motor according to a fourth embodiment.

It is noted that the embodiment shown in FIG. 5 has the grounding switch 18 connected simply to the W phase that is one of three phases of the main motor. Instead, there may be a set of grounding switches connected to two or all of the three phases to attain similar effects.

Fifth Embodiment

Figure 6:
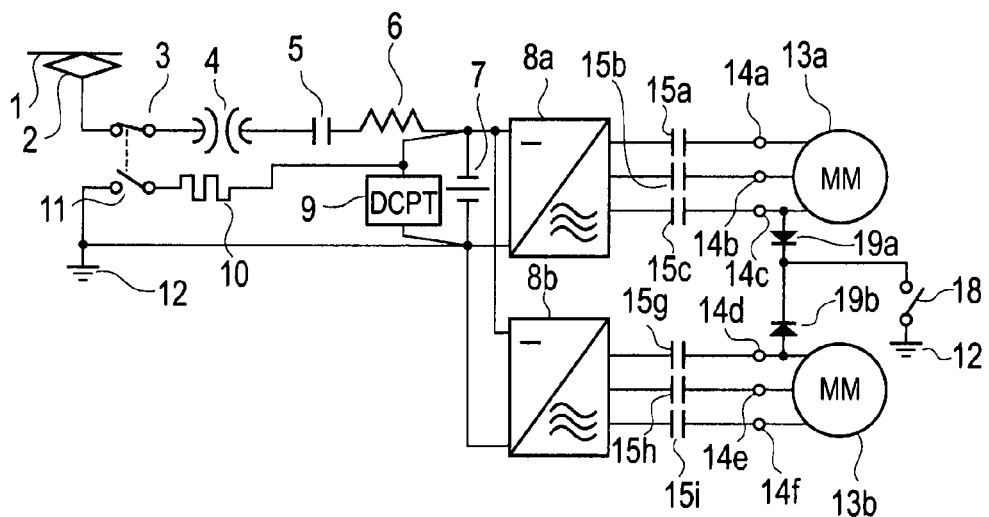
FIG. 6 is a circuit diagram showing the configuration of a main circuit of an electric motor car control system including a grounding switch connected to a main motor, with rectifiers interconnected in between, according to a fifth embodiment.

Description is now made of an electric motor car control system according to a fifth embodiment, with reference to FIG. 6. FIG. 6 shows the electric motor car control system according to the fifth embodiment. This is different from the electric motor car control system according to the fourth embodiment shown in FIG. 5 in that it is configured with a set of main motors 13a and 13b to be driven in parallel.

The electric motor car control system according to this embodiment includes two inverters 8a and 8b connected parallel to a filter capacitor 7. One inverter 8a has, at an alternate-current end thereof, main motor terminals 14a, 14b, and 14c connected to a main motor 13a. The other inverter 8b has, at an alternate-current end thereof, main motor terminals 14d, 14e, and 14f connected to another main motor 13b. There is a set of cut-off switches 15a, 15b, and 15c installed at the alternate-current end of the inverter 8a, there being a set of cut-off switches 15g, 15h, and 15i installed at the alternate-current end of the inverter 8b. Further, rectifiers 19a and 19b are used to ground the main motor terminal 14c and the main motor terminal 14d, through a single common grounding switch 18, to a ground 12. The terminal 14c is provided for a W phase that is one phase on the side of the main motor 13a. The terminal 14d is provided for a U phase that is one phase on the side of the main motor 13b. It is noted that the connection to terminal may be made at any phase, as the selection is not specifically limited.

In the electric motor car control system according to this embodiment, provision of the rectifiers 19a and 19b enables avoiding short-circuits that otherwise might occur between the main motor terminals 14c and 14d when the main motors are energized. It therefore is possible to use a single grounding switch 18 for discharging electric charges in stray capacitances, even in the case including the set of main motors 13a and 13b.

It is noted that this embodiment is an example for the case of two main motors. Also for three or more main motors, there may be main motor terminals likewise provided each for one phase of a corresponding main motor and connected through rectifiers 19 to a single grounding switch 18 being common to have discharge currents confluent in a sense. There is no limitation to the number of main motors. For inverters of electric motor cars provided with a typical set of four or eight main motors, the four or eight main motors may be connected through rectifiers 19 to a single grounding switch 18, to securely discharge electric charges in their stray capacitances. Also, there may be a combination of filter capacitor and inverter arranged in a 1:1 corresponding manner.

Sixth Embodiment

Figure 7:
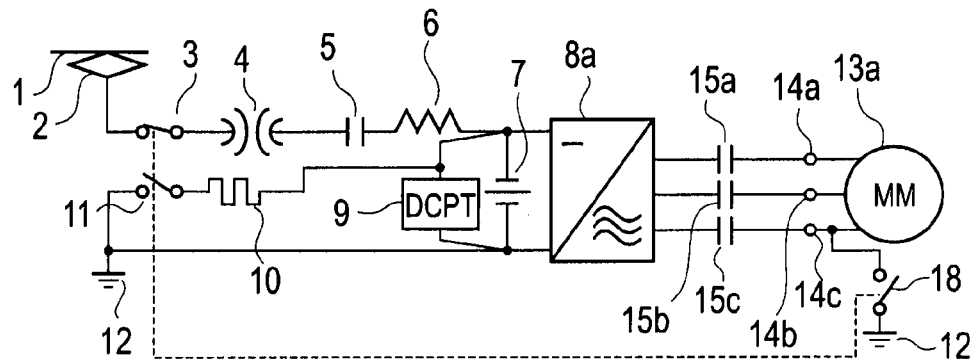
FIG. 7 is a circuit diagram showing the configuration of a main circuit of an electric motor car control system including a grounding switch interlocked with a main switch according to a sixth embodiment.

Description is now made of an electric motor car control system according to a sixth embodiment, with reference to FIG. 7. FIG. 7 shows the electric motor car control system according to the sixth embodiment. This is different from the electric motor car control system according to the fourth embodiment shown in FIG. 5 in that it is configured with a grounding switch 18 interlocked with a main switch 3, to have the main switch 3 open while the grounding switch 18 is closed. The remaining constituent elements are similar to those of the fourth embodiment.

According to this embodiment, besides the effects of the fourth embodiment, it is possible to prevent grounding faults of a main motor 13a that otherwise might occur when a VVVF inverter 8a is energized by closing the main switch 3 while the grounding switch 18 is left as it is closed. It is noted that the configuration of this embodiment is likewise applicable to also the fifth embodiment shown in FIG. 6, to attain similar effects.

Seventh Embodiment

Figure 8:
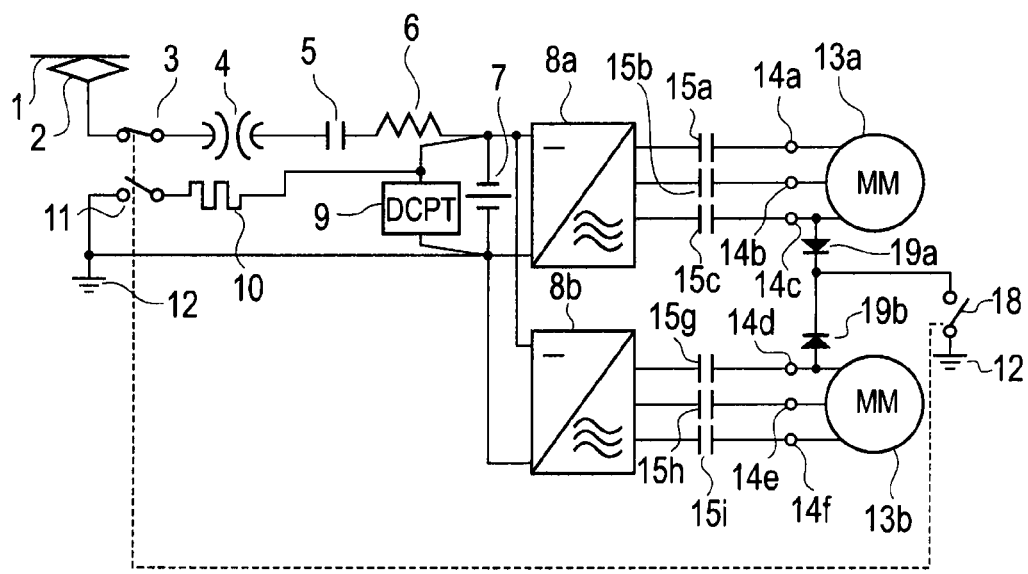
FIG. 8 is a circuit diagram showing the configuration of a main circuit of an electric motor car control system including a grounding switch interlocked with a main switch according to a seventh embodiment.

Description is now made of an electric motor car control system according to a seventh embodiment, with reference to FIG. 8. FIG. 8 shows the electric motor car control system according to the seventh embodiment. This is different from the electric motor car control system according to the fifth embodiment shown in FIG. 6 in that it is configured with a grounding switch 18 interlocked with a main switch 3, to have the main switch 3 open while the grounding switch 18 is closed. The remaining constituent elements are similar to those of the fifth embodiment.

According to this embodiment, besides the effects of the fifth embodiment, it is possible to prevent grounding faults of main motors 13a and 13b that otherwise might occur when VVVF inverters 8a and 8b are energized by closing the main switch 3 while the grounding switch 18 is left as it is closed.

Eighth Embodiment

Figure 9:
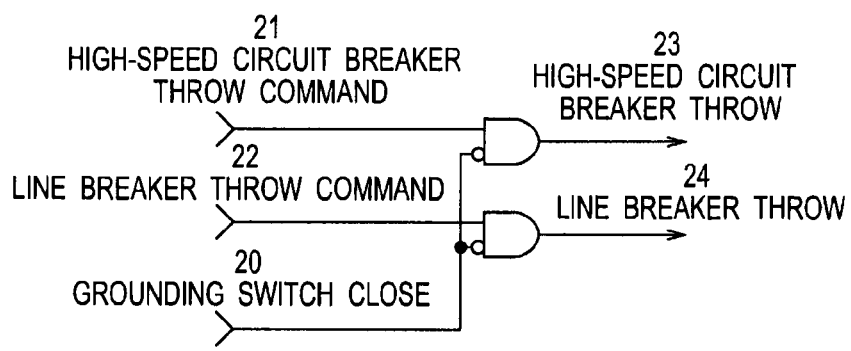
FIG. 9 is a sequence chart for a control employed to disable throwing a high-speed circuit breaker and a line breaker in a closed state of a grounding switch in an electric motor car control system according to an eighth embodiment.

Description is now made of an electric motor car control system according to an eighth embodiment, with reference to FIG. 5 and FIG. 9. The electric motor car control system according to this embodiment is different from the electric motor car control system according to the fourth embodiment shown in FIG. 5 in that it is adapted to throw a high-speed circuit breaker 4 and throw a line breaker 5 by using a control logic shown in FIG. 9.

The electric motor car control system according to this embodiment has a grounding switch 18 connected between a ground 12 and a main motor terminal 14c provided for a W phase that is one phase. There is an interlock configured to work in a closed state of the grounding switch 18 (in a H state of a command 20), to block both a high-speed circuit breaker throw command 21 and a line breaker throw command 22, whereby the high-speed circuit breaker 4 or the line breaker 5 is kept from being thrown.

Accordingly, besides the effects of the fourth embodiment, it is possible to prevent grounding faults of a main motor 13a that otherwise might occur when a VVVF inverter 8a is energized by throwing the high-speed circuit breaker 4 and the line breaker 5 while the grounding switch 18 is left as it is closed.

The control logic of FIG. 9 in this embodiment may be implemented by providing an auxiliary contract of the grounding switch 18 serially connected to electric circuits conducting a high-speed circuit breaker throw signal 23 and a line breaker throw signal 24. Or else, it may be implemented by operations of a microprocessor that the electric motor car control system has.

While certain embodiments have been described, these embodiments are not intended to limit the scope of the inventions, and may be embodied in a variety of forms. For instance, main motors 13 described as permanent magnet type motors may be alternate-current motors allowing for wide application. Also, grounding switches 18 may be a manual open-close type or of a type interlocked with a cut-off switch, whichever is applicable to the embodiment in FIG. 5 or FIG. 6. Also, they may be configured to interlock with open-close actions of a lid of a container to be opened and closed, as necessary, for worker operations to touch a main circuit. Further, resistors 17 employed may have resistances, as necessary, not to mar the objective of preventing an inverter 8 from being damaged by regenerative electric power due to inertial rotation of a main motor, that is, an inherent objective of installation of cut-off switches.

The invention claimed is:

1. An electric motor car control system comprising:
    a filter capacitor connected to a direct current power source, through a main switch;
    an inverter connected parallel to the filter capacitor, to convert a direct current into an alternate current;
    an alternating-current motor connected to the inverter so as to receive the alternate current;
    a set of cut-off switches inserted in wirings for phases of the alternate current between the inverter and the alternating-current motor;
    a discharge resistor connected to the filter capacitor;
    a discharge switch interlocked with the main switch, to be open when the main switch is close, and close when the main switch is open, to ground the discharge resistor to a ground; and
    a resistor connected to at least one of the wirings, parallel to one switch of the set of cut-off switches, to avoid electrical shocks due to electric charges accumulated in stray capacitances of the alternating current motor when touching a portion of the wirings between the cut-off switches and the alternating current motor.

2. The electric motor car control system according to claim 1, further comprising:
    a secondary set of cut-off switches, each inserted in series with each switch of the set of cut-off switches, in wirings for phases of the alternate current between the inverter and the alternating-current motor; and
    a secondary resistor connected to at least one of the wirings, parallel to at least one switch of the secondary set of cut-off switches.

3. The electric motor car control system according to claim 1, further comprising:
    a secondary set of cut-off switches, each inserted in series with each switch of the set of cut-off switches, in wirings for phases of the alternate current between the inverter and the alternating-current motor;
    wherein, the resistor is connected to at least one of the wirings, parallel to one switch of the set of cut-off switches and one switch of the secondary set of cut-off switches.

4. The electric motor car control system according to claim 1, wherein, in place of the resistor, a grounding switch is connected to one of the wirings between the alternating-current motor and one switch of the set of cut-off switches.

5. The electric motor car control system according to claim 4, wherein, the grounding switch is interlocked with the main switch, to set to be open when the main switch is close, and close when the main switch is open.

6. The electric motor car control system according to claim 4 or 5, further comprising:
    a controller configured to interrupt supply of electric source power to the inverter when the alternating-current motor is grounded by the grounding switch.

7. The electric motor car control system according to claim 4, further comprising:
    at least one secondary inverter connected parallel to the filter capacitor, to convert the direct current into an alternate current;
    at least one secondary alternating-current motor connected to the secondary inverter so as to receive the alternate current; and
    at least one secondary set of cut-off switches inserted in wirings for phases of the alternate current between the secondary inverter and the secondary alternating-current motor;
    wherein, the grounding switch is connected to one of the wirings of the alternating-current motor via a first rectifier and connected to one of the wirings of the secondary alternating-current motor via a second rectifier.

8. The electric motor car control system according to claim 7, wherein, the grounding switch is interlocked with the main switch, to set to be open when the main switch is close, and close when the main switch is open.

9. The electric motor car control system according to claim 7 or 8, further comprising:
    a controller configured to interrupt supply of electric source power to the inverter and the secondary inverter when the alternating-current motor or the secondary alternating-current motor is grounded by the grounding switch.

* * * * *